United States Patent
Tsunekawa

(10) Patent No.: US 8,717,622 B2
(45) Date of Patent: May 6, 2014

(54) IMAGE PROCESSING APPARATUS, IMAGE PROCESSING METHOD AND PROGRAM

(75) Inventor: Kiyohiro Tsunekawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 259 days.

(21) Appl. No.: 13/186,554

(22) Filed: Jul. 20, 2011

(65) Prior Publication Data
US 2012/0050761 A1    Mar. 1, 2012

(30) Foreign Application Priority Data

Aug. 24, 2010 (JP) ................................. 2010-187223

(51) Int. Cl.
*H04N 1/60* (2006.01)
(52) U.S. Cl.
USPC .............................. 358/1.9; 382/190; 345/660
(58) Field of Classification Search
USPC ......................................................... 358/1.9
See application file for complete search history.

(56) References Cited

U.S. PATENT DOCUMENTS

| | | | |
|---|---|---|---|
| 6,259,821 | B1 | 7/2001 | Branciforte et al. |
| 6,734,989 | B2 | 5/2004 | Tsunekawa |
| 7,965,411 | B2 | 6/2011 | Suzuki |
| 8,175,155 | B2 | 5/2012 | Suwa et al. |
| 2004/0024835 | A1 | 2/2004 | Howard |
| 2006/0050319 | A1 | 3/2006 | Suzuki |
| 2007/0002080 | A1* | 1/2007 | Ishizaka .......................... 345/660 |
| 2008/0002766 | A1 | 1/2008 | Suwa et al. |
| 2009/0214119 | A1* | 8/2009 | Oishi .............................. 382/190 |

FOREIGN PATENT DOCUMENTS

| | | |
|---|---|---|
| CN | 101098387 A | 1/2008 |
| JP | 2000-137794 A | 5/2000 |
| JP | 2006-053786 A | 2/2006 |
| JP | 2006-072834 A | 3/2006 |
| JP | 2009-105827 | 5/2009 |

OTHER PUBLICATIONS

Japanese Office Action dated Jan. 14, 2014, issued in counterpart Japanese Application No. 2010-187223.
Chinese Office Action dated Nov. 21, 2013, issued in counterpart Chinese Application No. 201110243474.5, and English-language translation thereof.

* cited by examiner

*Primary Examiner* — Steven Kau
*Assistant Examiner* — Andrew H Lam
(74) *Attorney, Agent, or Firm* — Fitzpatrick, Cella, Harper & Scinto

(57) ABSTRACT

A thickening process is applied to a thin line fill figure that is not a line drawing command, and thereby output with an improved reproducibility is performed. An image processing apparatus includes: a drawing command determination section that determines whether a drawing command is a fill figure that forms a thin line; and a line width correction section that performs line width correction process of a drawing command determined to be a fill figure that forms a thin line.

2 Claims, 12 Drawing Sheets

CONDITIONS FOR THICKENING PROCESS

| FIGURE SHAPE \ COMMAND TYPE | LINE DRAWING COMMAND (STROKE) | CLOSED REGION FILL COMMAND |
|---|---|---|
| ONLY HORIZONTAL/ VERTICAL COMPONENT | CASE 1: APPLY (CORRECT LINE WIDTH PARAMETER) | CASE 3: APPLY (CORRECT COORDINATE VALUE AT RIGHT-BOTTOM OF RECTANGLE) |
| FIGURE INCLUDING OBLIQUE COMPONENT | CASE 2: APPLY (CORRECT LINE WIDTH PARAMETER) | CASE 4: NOT APPLY (NO CORRECTION) |

FIG.6

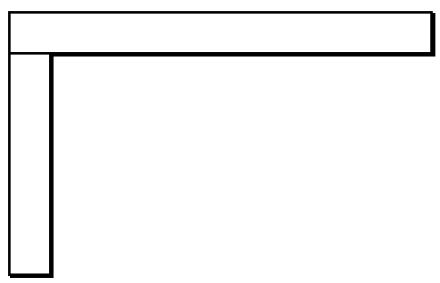 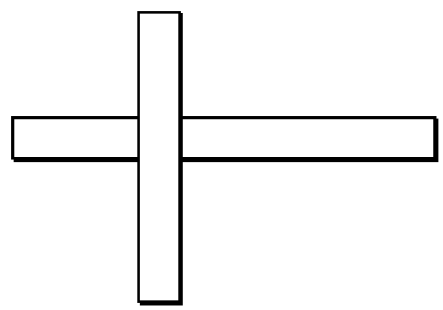

FIG.7A  FIG.7B

IMAGE PROCESSING APPARATUS, IMAGE PROCESSING METHOD AND PROGRAM

BACKGROUND OF THE INVENTION

1. Field of the Invention

The present invention relates to an image processing apparatus, an image processing method and a program for the generation of print data, according to a drawing command input from outside, and particularly relates to an image processing apparatus, an image processing method and a program that performs correction of the drawing command to improve the reproducibility of a line figure.

2. Description of the Related Art

Conventionally, there are known image processing devices that perform image formation that corresponds to input electronic data by a printer engine which uses toner or ink. These kinds of image processing devices have a problem that an extremely small figure with a closed area such as a thin line or the like cannot be reproduced as intended by the electronic data due to the characteristics of the printer engine. For example, in an electrophotographic process that forms an image by fixing a latent image, which corresponds to a page image, by toner on a sheet, if the area of a closed region that forms a figure is small, the adhesion-amount-of-toner tends to be small. Consequently, a closed region with a small area may be expressed comparatively thin. Herein, an arrangement is made, in general, such that data described by a page description language (hereinafter, referred to as PDL) including drawing commands, such as lines, characters and images, is received as the input electronic data and analyzed so as to generate the page image.

As a related art to solve the problem, a print control device is presented that is provided with a UI (user interface) capable of designating the amount of thickening of a thin line to control the width of thickening correspondingly to the color hue of the thin line and the contrast with the background color (Japanese Patent Laid-Open No. 2009-105827).

In the related art (Japanese Patent Laid-Open No. 2009-105827), a thickening process is realized by determining whether or not to thicken a line for a line drawing command to adjust the line width. However, line figures expressed by a fill figure (closed region fill command), such as a rectangular fill figure other than a line drawing command, are not considered. Accordingly, there is a problem that a thickening process is not applied to line figures which have been drawn by application software without using a line drawing command.

Further, in the related art (Japanese Patent Laid-Open No. 2009-105827), although a thickening width is arranged correspondingly to the contrast with a background and the like, problems with drawing by thickening, for example, in a case that line figures are adjacent to each other, are not particularly taken into account.

Herein, the drawing command, as described above, refers to a drawing object with attributes, such as coordinate values representing a start point and an endpoint, a line width, a color, the shape at the ends of a line, and the like. A line drawing command is, in general, also called line drawing or stroke drawing. Further, the fill figure (closed region fill command), as described above, refers to a drawing object that is defined as a figure (fill figure) whose closed inner region represented by a plurality of coordinate points or the like is filled with a designated color. Typical examples of fill figures include rectangles (quadrilaterals), polygons, circles, ellipses, and the like.

SUMMARY OF THE INVENTION

An image processing apparatus according to the present invention includes: a drawing command determination section that determines whether a drawing command having been input from outside is a fill figure that forms a thin line, depending on the type of a function that corresponds to the drawing command; and a line width correction section that performs a correction process of the line width on a thin line fill figure that is the drawing command determined to be a thin line fill figure.

According to the present invention, it is possible to provide an image processing apparatus, an image processing method and a program that can apply a thickening process to a thin line fill figure that is a figure other than a line drawing command, and thereby perform output with an improved reproducibility.

Further features of the present invention will become apparent from the following description of exemplary embodiments (with reference to the attached drawings).

BRIEF DESCRIPTION OF THE DRAWINGS

FIG. 6 is a table showing conditions for performing a thickening process on combinations of the type of a drawing command and a figure shape;

FIGS. 7A and 7B are diagrams showing the position relationship between a plurality of rectangles that are different from each other with respect to horizontal or vertical direction;

DESCRIPTION OF THE EMBODIMENTS

Figure 1:
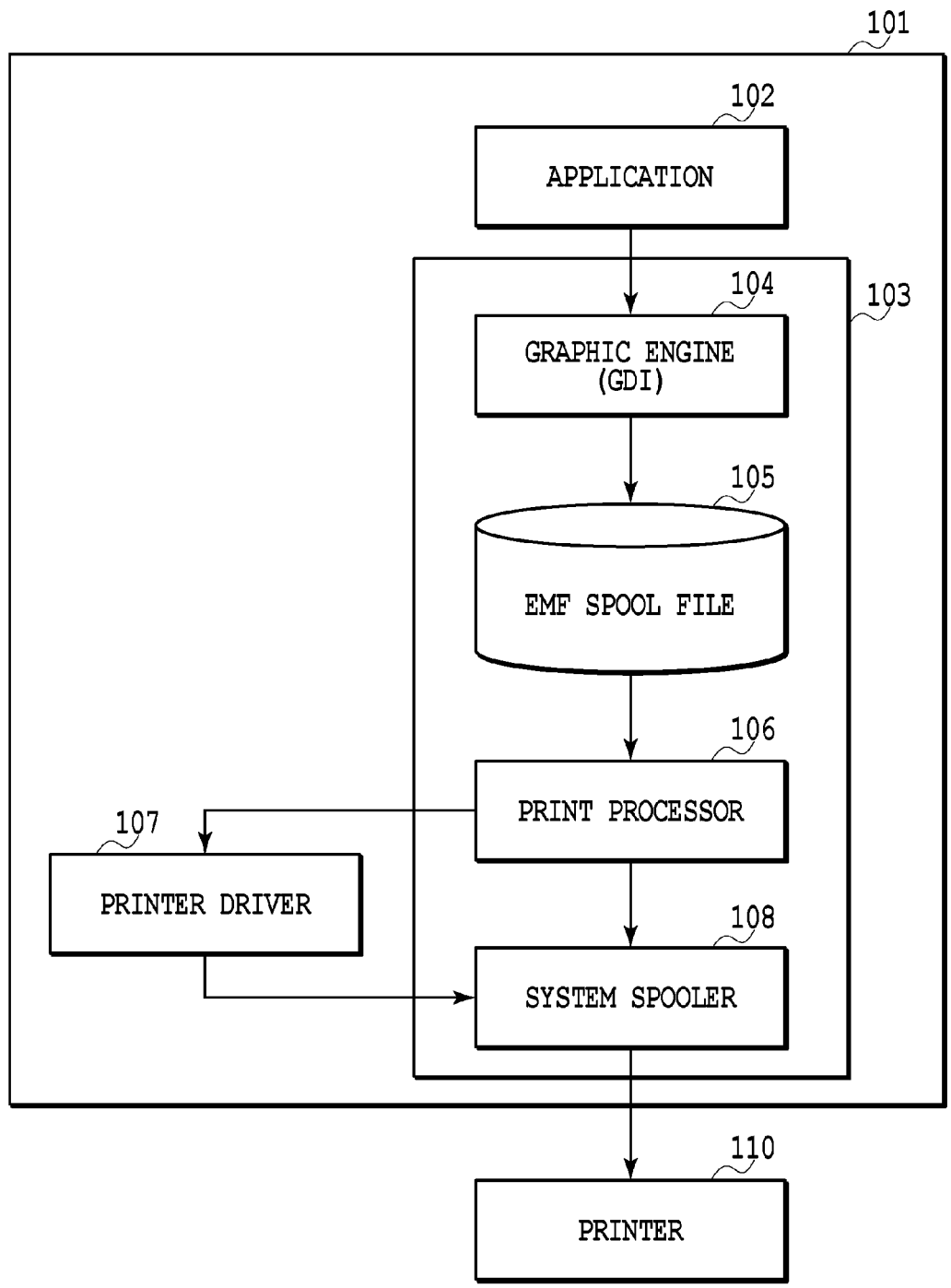
FIG. 1 is a block diagram showing the configuration of a software module of an image processing apparatus in one embodiment.

Best modes for carrying out the present invention will be described below, referring to the drawings. However, the elements for configuration described in these embodiments are no more than examples, and the scope of the invention is not limited thereto.

First Embodiment

In the present embodiment, an example of applying the present invention, as a printer driver that operates on an operating system (hereinafter, referred to as OS) of a host computer, will be described.

FIG. 1 is a block diagram showing a printer driver 107 and the module configuration of software that operates on a host computer 101 related to a printing process, to which one embodiment according to the present invention is applied.

Herein, the group of software modules is executed such that the OS loads program codes stored as files in an external storage device, not shown, on a RAM, not shown, and a CPU of the host computer 101 executes the program codes. Functions according to the present invention are realized by collaboration between the group of software modules and a group of hardware devices.

The group of the software modules in the present embodiment can be roughly categorized into an application program 102, an OS (103), and the printer driver 107. Further, the module in charge of print processing by the OS (103) is provided with a graphic engine 104, a print processor 106, and a system spooler 108.

In order to perform a print instruction to a printer 110, the application program 102 first calls a GDI (graphic device interface), which is a group of service functions of the graphic engine 104, and thereby issues a drawing command.

Then, the graphic engine 104 generates a spool file (EMF: enhanced meta file) in an intermediate code format, based on the print instruction having been received via the GDI, and temporarily spools this spool file in the storage area on a HDD.

Subsequently, the print processor 106 reads print data temporarily stored as the spool file 105, converts the drawing instruction into a corresponding DDI (device driver interface) function, and thereby performs the drawing instruction to the printer driver 107. Herein, the print processor 106 performs a process of converting the drawing instruction by the GDI function into a DDI function that the printer driver 107 can receive, corresponding to the processing capacity declared by the printer driver in advance.

On the other hand, the printer driver 107 generates a PDL (page description language) command that can be processed by the printer 110, based on the drawing instruction by the DDI function. Then, the PDL command is output from the system spooler 108 via an interface, such as a network, to the printer 110 as a print job.

Figure 2:
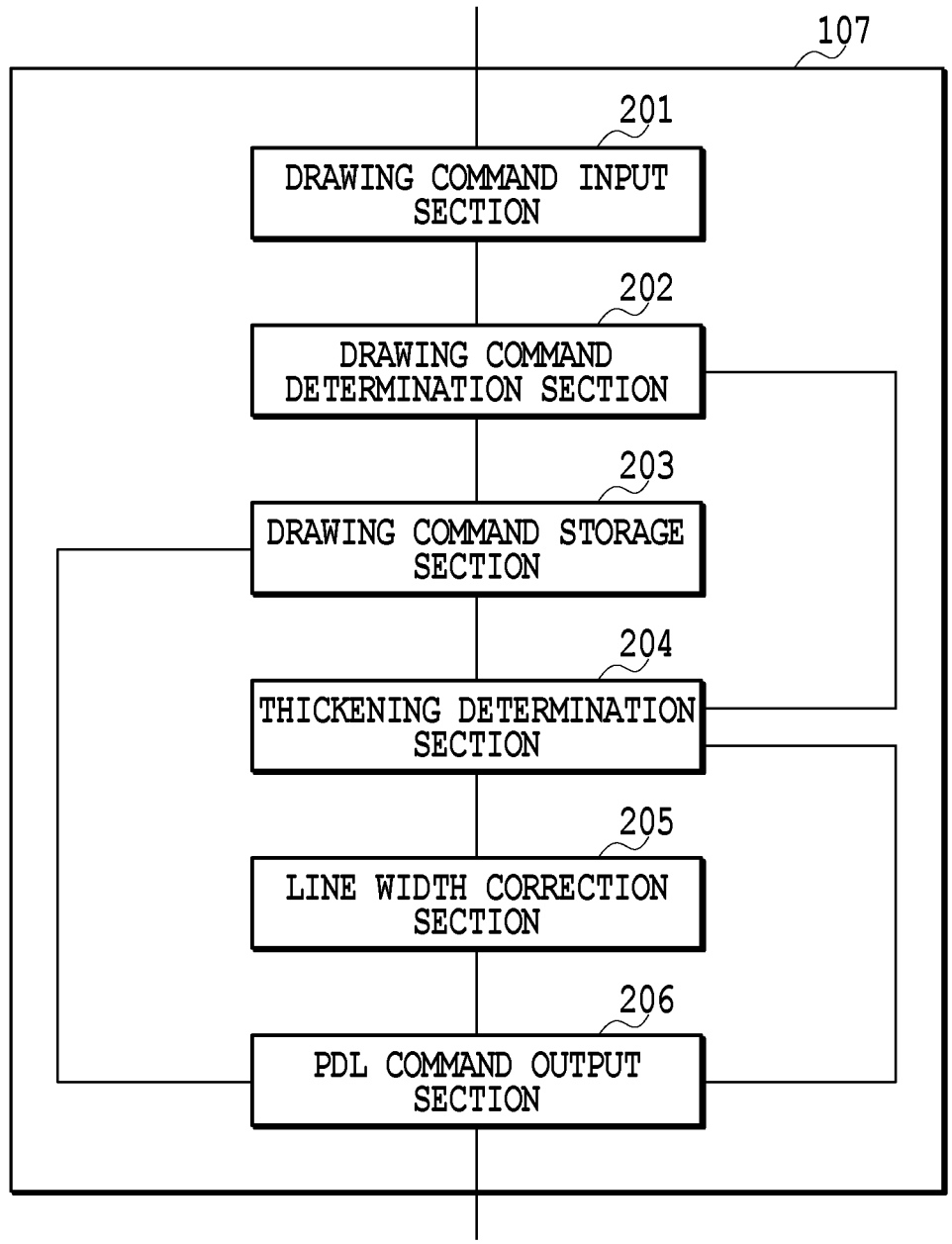
FIG. 2 is a block diagram showing the configuration of a drawing processing module of a printer driver in the one embodiment.

FIG. 2 is a block diagram showing the configuration of the drawing processing module in the printer driver 107 in the present embodiment. Reference numeral 201 in the figure represents a drawing command input section that receives a drawing command by the DDI function from the print processor 106.

Reference numeral 202 represents a drawing command determination section that determines whether or not the drawing command is a drawing command representing a thin line shape. As described later, it is determined whether or not to apply a thickening process to a drawing command determined to be a thin line shape by the drawing command determination section 202. Targets of the determination as to whether or not a command includes a thin line shape can be only line drawing commands, or can be both line drawing commands and closed region fill commands. The details of the processing by the drawing command input section 201 and the drawing command determination section 202 will be described later, using FIG. 5.

Reference numeral 203 represents a drawing command storage section for temporarily holding drawing commands having been determined to be thin line shapes by the drawing command determination section 202. The drawing command storage section 203 is assigned on a RAM that the printer driver 107 has obtained by making a request for obtaining to the OS (103).

Subsequently, a thickening determination section 204 sequentially reads out drawing commands held by the drawing command storage section 203, and determines whether or not to apply the thickening process, based on the position relationship between the drawing commands. Herein, the thickening determination section 204 is called each time a drawing command determined to be a thin line shape by the drawing command determination section 202 is received. However, when no drawing command is held by the drawing command storage section 203, the thickening determination section 204 does not perform determination processing.

A determination as to whether or not to apply the thickening process by the thickening determination section 204 is not limited such that the determination is made based on the position relationship between the drawing commands. For example, the thickening determination may be performed, based on the type and the figure shape of a drawing command determined by the drawing command determination section 202.

On the other hand, a line width correction section 205 performs line width correction by correcting drawing parameters of a drawing command having been determined to be an object of thickening by the thickening determination section 204. Finally, a PDL command output section 206 sequentially converts the drawing commands by DDI functions into PDL commands to output them to the system spooler 108.

In case of performing a thickening determination, based only on the types of respective DDI functions and figure shapes by the drawing command determination section 202 without depending on the position relationships between the drawing commands, the drawing command storage section 203 sequentially performs storage and output of the drawing commands. Further, in this case, the thickening determination section 204 makes a determination of whether to perform the thickening process on all drawing commands of thin line shapes stored in the drawing command storage section 203.

Figure 3:
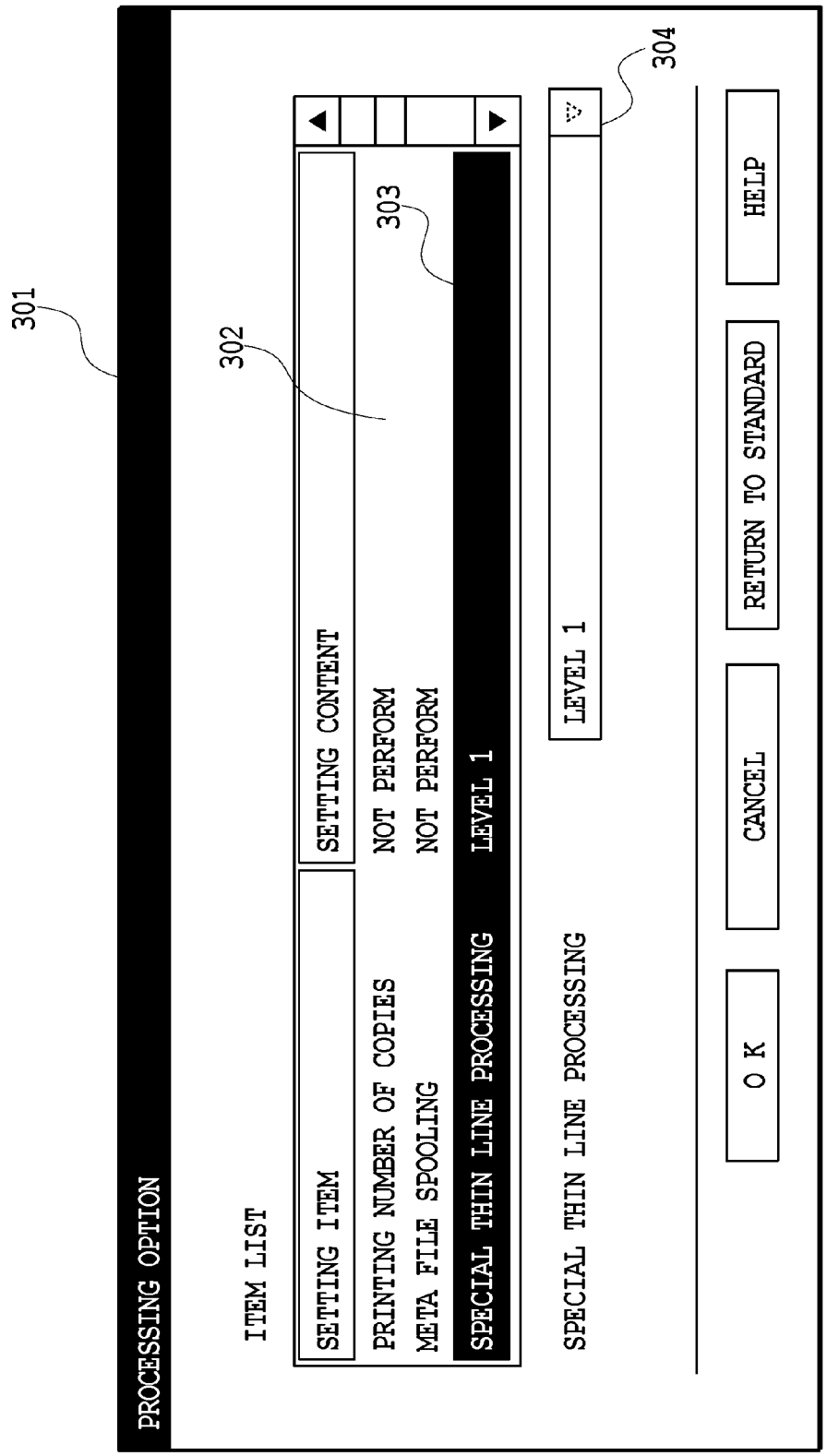
FIG. 3 is a diagram showing an example of the user interface of the printer driver.

FIG. 3 is a diagram showing an example of a user interface for changing the settings of the printer driver 107 in the present embodiment.

In the figure, a dialog box 301 is a dialog box displayed when a button 'processing option' is pressed via a setting screen for performing various print settings. A list 302 in the dialog box 301 displays a list of respective setting items and setting contents selectable for a user. Further, a selected setting item is reversely displayed as shown with reference numeral 303, and selective options of setting contents are displayed in a lower portion, as shown by a pull-down menu 304.

In the present embodiment, as an instruction means for controlling the thickening process of a thin line figure, a setting item 'Special Thin Line Process' is provided (303). Further, as setting contents for 'Special Thin Line Process', there are prepared 'Doing Nothing/Level 1/Level 2'. That is, if 'Special Thin Line Process' is set to 'Doing Nothing', then the drawing command determination section 202 does not make a determination of a thin line on any drawing command and can make any thickening process invalid. Further, if 'Level 1' is selected, then the drawing command determination section 202 performs a thin line determination only on line drawing commands. If 'Level 2' is selected, then the drawing command determination section 202 performs the thin line determination on both line drawing commands and closed region fill commands. In the present embodiment, the initial value of 'Special Thin Line Process' is set to 'Level 2', however, the initial value may be appropriately changed, for example, in consideration of compatibility with existing products.

Referring to FIGS. 4A to 4D, 5, and 6, the procedure of the thickening process performed by the printer driver 107 on a thin line shape figure will be described below.

FIGS. 4A to 4D are diagrams showing the details of a thickening correction process on a fill figure determined to be an object of thickening. This process corresponds to S502, S503, S504, and S505 in FIG. 5. FIGS. 4A and 4C and FIGS. 4B and 4D show figure shapes and drawing parameters before and after the thickening correction process, respectively.

In the present embodiment, a case that a closed region fill figure (closed region fill command) expresses a rectangle will be described. First, in FIG. 4A, a rectangle is represented by left-top edge coordinate values (x1, y1) and right-bottom edge coordinate values (x2, y2). Representing the width and the height of this rectangle by w and h, w and h are obtained by (w, h)=(x2−x1, y2−y1). Herein, if w=1 and h>n (Value n is an integer value of 1 or greater), the closed region fill figure is determined to be a vertical thin line (FIG. 4A), and if h=1 and w>n (Value n is an integer value of 1 or greater), this closed region fill figure is determined to be a horizontal thin line (FIG. 4C). The coordinate values are described by a unit coordinate system of print resolution that the printer driver 107 has notified to the OS (103), and is generally 600 dpi or the like.

Subsequently, the closed fill figure determined to be a thin line is subjected to a thickening correction by replacing the coordinate values (x2, y2) at the right-bottom edge to (x2+1, y2+1) with an increase by 1 both in x axis direction and y axis direction. By such correction of the right-bottom edge coordinates, the regions in FIGS. 4B and 4D represented by hatching come to be drawn thicker than the original figures. In the present embodiment, the thickening correction is performed, regardless of whether the rectangle is a vertical thin line or a horizontal thin line, by increasing both the x and y coordinates by 1. However, depending on a result of the determination on the vertical thin line/horizontal thin line, correction may be performed such as not to thicken the figures in the height direction (longitudinal direction). In this case, in the example in FIG. 4A, correction is made such that x2 and y2 respectively become x2+1 and y2. On the other hand, in the example in FIG. 4C, correction is made such that x2 and y2 respectively become x2 and y2+1.

Figure 5:
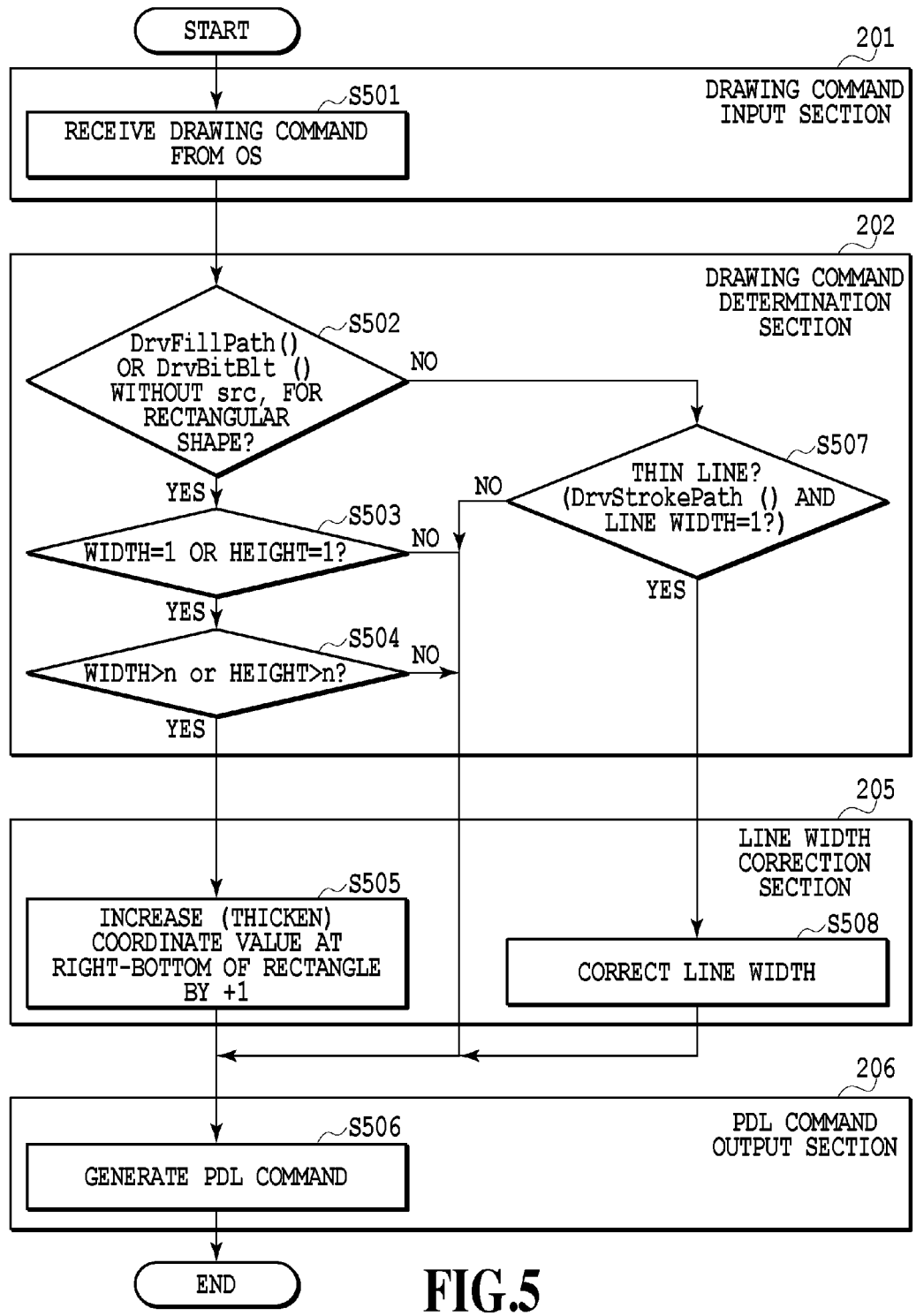
FIG. 5 is a flowchart showing the procedure of a thin line correction process in the one embodiment.

FIG. 5 is a flowchart showing the procedure of a thin line correction process in the present embodiment. First, in S501, the drawing command input section 201 receives a DDI function and parameters thereof from the OS 103 as a drawing command.

<Determination as to Whether Drawing Command is Closed Region Fill Command in Rectangular Shape (S502)>

Subsequently, in S502, the drawing command determination section 202 checks if the drawing command is a closed region fill command in a rectangular shape.

Specifically, first, the drawing command determination section 202 determines whether the DDI function received in S501 is either (1) a DrvFillPath ( ) or (2) a DrvBitBlt ( ) function without designation of a source image. Then, if the DDI function is either function, the DDI function is determined to be a closed region fill command (If the DDI function is neither function, the process proceeds to S507).

Herein, (1) a DrvFillPath ( ) function is a function to receive outline coordinate values for representing the outline of a figure, a color value to fill the figure, and the like, as parameters. If the DDI function is (1) a DrvFillPath ( ) then the outline coordinates of the closed region received as the parameters of this function are checked, and it is determined whether or not the closed region fill figure has a rectangular shape. That is, it is checked if the number of outline coordinate points is four, and vectors forming the outline are only of horizontal and vertical components. If these conditions are all satisfied, it is determined that the closed region fill figure has a rectangular shape. If it is determined that the closed region fill figure has a rectangular shape, then the process proceeds to S503, and if not, then the process proceeds to S507.

On the other hand, (2) a DrvBitBlt ( ) function is a DDI function to instruct image drawing. A function (2) DrvBitBlt is a function to receive a source image (src) as an entity image, the color format and size (number of pixels) of the src, coordinate information representing the drawing region of the image, and the like, as parameters. Herein, the drawing region is a region in a rectangular shape called a destination (dest), and the coordinate information is given as coordinate values of the left-top edge and the right-bottom edge of the rectangle. Incidentally, the size of the dest and the size of the src do not need to agree with each other, and for example, in a case that dest is larger than src, src is expanded by a known image expanding method and thus drawn. In case that an image entity is not received (That is, the src parameter is NIL.), the DrvBitBlt ( ) function becomes an instruction to fill the dest with a brush color designated by another parameter. Accordingly, when this function ((2) DrvBitBlt ( ) function) is received and no source image is designated, the drawing command should be handled as a closed region fill command expressing a rectangular shape represented by the coordinate information on the dest, without the necessity of checking the outline coordinates. That is, the process proceeds to S503 in this case. Incidentally, if src is designated, the process proceeds to S507 even with this function.

<Determination as to Whether Closed Region Fill Command is Thin Line (S503 and S504)>

Subsequently, the drawing command determination section 202 checks if either the width or the height of a closed region determined to be a rectangular shape is 1 (S503) and the other one is a predetermined value n or greater (S504). If both these conditions are satisfied, then the rectangle drawing command is determined to be a thin line. Herein, the value n is a threshold value (an arbitrary integer value of 1 or greater) of a length for making a thin line be a correction target, and is herein set to n=2.

Figure 4A:
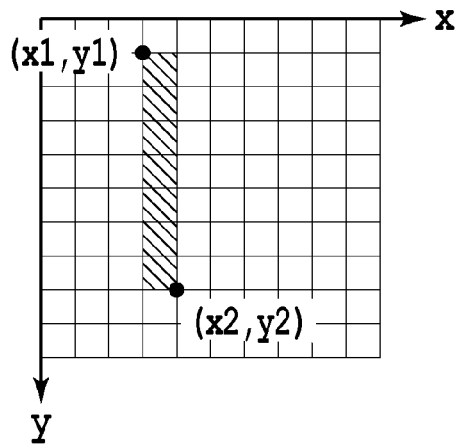
FIGS. 4A to 4D are diagrams showing shapes before and after a thickening correction process on a fill figure.
Figure 4B:
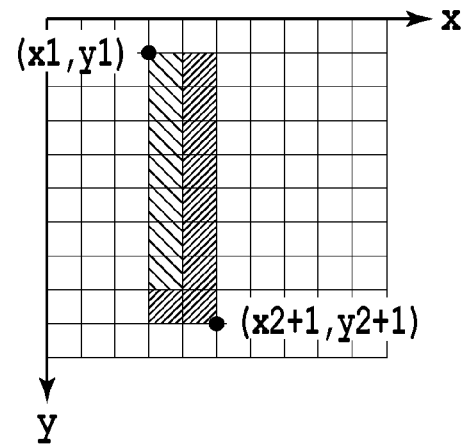
Figure 4C:
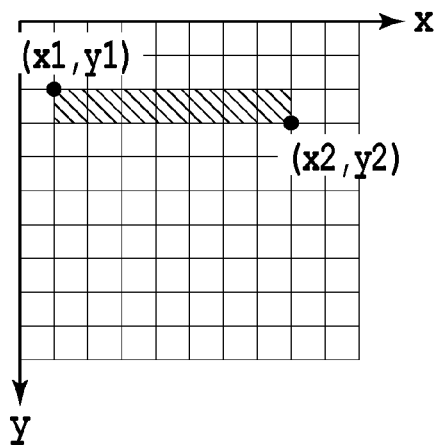
Figure 4D:
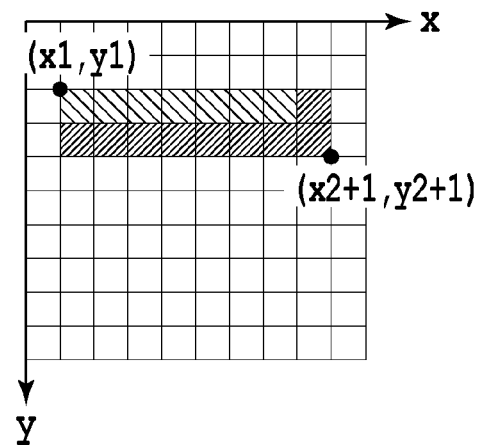

For example, in the case of the rectangle in the shape shown in FIG. 4A, the width and the height of the rectangle are respectively calculated by x2−x1 and y2−y1 (These x1, x2, y1, and y2 of these two coordinate points are received, as described above, as parameters of (1) DrvFillPath ( ) function.). Accordingly, if x2−x1 is 1 (determined Yes in S503), and y2−y1 is the threshold value n or greater (determined Yes in S504), the rectangle is determined to be a thin line. In case of a horizontal line as shown in FIG. 4C, the height is determined to be 1 in S503, and the width is determined to be the threshold value n or greater in S504, and the rectangle is accordingly determined to be a thin line similarly to the case of FIG. 4A. The width, the height, and the length are not limited to the values used in the description here. As long as it is possible to determine whether a closed region fill command is a thin line, arbitrary values can be set.

As has been described above, by the process in S502 to S504, it is determined whether or not a drawing command is a closed region fill command (thin line fill figure) that forms a thin line, depending on the type of the DDI function received in S501 and the width and the height of the closed region.

<Thickening Process (S505)>

Further, if the determination results in S503 and S504 are Yes (namely, a case that the drawing command is a fill figure for a thin line), the thickening process (line width correction process) is performed on the thin line in S505. In the thickening process, the line width correction section 205 corrects the coordinate value parameters of the rectangle drawing command (S505), and the PDL command output section 206 generates and outputs a rectangle drawing command in a PDL format, based on the parameters after the correction.

For example, in the case of the rectangle in the shape shown in FIG. 4A, the line width correction section 205 increases the coordinate values (x2, y2) of the rectangle right-bottom edge by +1 with respect to both x and y, and corrects the coordinate values to (x2+1, y2+1) as shown in FIG. 4B.

The coordinate values of the drawing region (dest) designated by the parameters of (2) DrvBitBlt ( ) function are just similar to those of the rectangle shown in FIG. 4A, and the determination process in S503 and S504 can be the same also for the DrvBitBlt ( ) function without a designation of src.

In the present embodiment, an arrangement is made such that the drawing command determination section 202 performs a thickening determination, based only on the type and the shape of each individual DDI function. Accordingly, the drawing command storage section 203, shown in FIG. 2, only performs sequential storing and reading of drawing commands, and the thickening determination section 204 performs no processing. Therefore, the drawing command storage section 203 and the thickening determination section 204 are not explicitly described in the flowchart in FIG. 5 (these two sections take roles in the second embodiment and after).

<Process not in Case of Closed Region Fill Command of Rectangular Shape (S507 and S508)>

Processing in case of 'No' in S502 (That is, in a case that the drawing command received in S501 is not a closed region fill command of a rectangular shape) will be described below.

In S507, the drawing command determination section 202 checks whether or not the drawing command is a line drawing command for drawing a thin line. That is, the drawing command determination section 202 checks whether the DDI function is a DrvStrokePath ( ) Further, if the line width parameter of this line drawing command is 1 (a predetermined value), the drawing command determination section 202 determines that the drawing command is for a thin lime, and the process proceeds to S508. On the other hand, if the DDI function is not a DrvStrokePath ( ) or if the line width parameter of the line drawing command is not 1 (the predetermined value) (No in S507), then the process proceeds to S506. In S508, the line width parameter is corrected by +1.

Incidentally, in the present embodiment, a line with a width of 1 (the predetermined value) is determined to be a thin line (target of correction), and further the correction value for thickening the figure is fixed to be 1, however, this predetermined value and the correction value may be set to arbitrary values, based on the reproductive characteristics of a device and the like.

Finally, in case of 'No' in S507, a PDL command corresponding to the drawing command is generated, and then the process is terminated (S506).

Incidentally, in case that 'the Special Thin Line Process' in FIG. 3 is set to "Doing Nothing", determination results of S502 and S507 become always 'No', and any drawing command is not determined to be a thin line. Further, 'the Special Thin Line Process' is set to "Level 1", the drawing command determination section 202 controls the apparatus such that determination is always made 'No' only in S502.

FIG. 6 is a table showing conditions for performing the thickening process on a combination of the type of a drawing command and a figure shape in the present embodiment. As shown in the table, if a drawing command is a line drawing command, in both cases, namely in a case that the figure shape is formed only by horizontal/vertical component (Case 1) and in a case that the figure shape includes an oblique component (case 2), the thickening process is performed by correcting the line width parameter. On the other hand, in a case that the drawing command is a closed region fill command, the thickening process is performed only on figures formed only by horizontal/vertical components (Case 3) in the present embodiment, and the thickening process is not performed on figures including an oblique component (Case 4). However, in a case that a delay of the processing speed by the determination process on a figure shape is permitted, the thickening process may be performed also on figures including an oblique component (Case 4). A user can set whether or not to perform the thickening process via the UI.

As has been described above, according to the present embodiment, the thickening process can also be applied to a thin line expressed by a fill figure (closed region fill command) in a rectangular shape. Therefore, output with a high reproducibility can be performed even for a line figure that is drawn by application software without a use of a line drawing command.

Further, as described above with reference to FIGS. 3 and 6, a target of the thickening process can be set by an instruction by the user. As a result, it is possible to prevent a drop in the processing speed of the entire image processing caused by the thickening process.

Second Embodiment

In the first embodiment, the closed region fill figure determined to be a thin line is unconditionally subjected to a correction process. However, an arrangement may be made such as to enable selection as to whether or not to perform the correction process, depending on conditions. In the present embodiment described below, a thickening process is not performed in case that a figure subjected to the thickening process overlaps with an adjacent figure. For example, in case that the present figure is a vertical line and an adjacent figure is also a vertical line, the thickening process is not performed. This is because a thin line would become an extremely thick line. However, in a case that the present figure is a vertical line and an adjacent figure is a horizontal line, the present figure is exceptionally thickened. This is because, although the negative effect that the two figures become continuous occurs, the negative effect that the vertical line could disappear by not thickening is more significant.

In the present embodiment, a thickening determination result is switched, having the adjacency state between a plurality of closed region fill figures be conditions for the correction process.

Referring to FIGS. 7A and 7B, 8A to 8D, 9 and 10, a method of switching a thickening determination result on a plurality of closed region fill figures having been determined to be thin line shapes, wherein the switching depends on the position relationship between the closed region fill figures, will be described below.

First, referring to FIGS. 7A to 8D, the effects of thickening processing will be described, wherein the effects correspond to the adjacency state between a plurality of closed region fill figures.

FIGS. 7A and 7B show respective cases in which two rectangles intersect each other. For example, in a case of forming rule lines, such as a ledger sheet, rectangles may become in such a position relationship. In this case, effects on mutual figures are small even after performing a thickening process (That is, the overlapping state does not change. It does not occur that figures having not been overlapped with each other become overlapped by the thickening process). Accordingly, the thickening process may be performed.

Figure 8A:
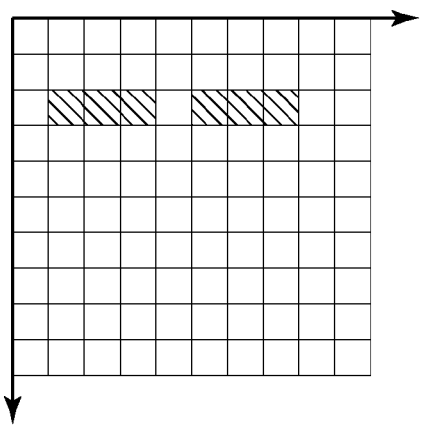
FIGS. 8A to 8D are diagrams showing the position relationship between a plurality of rectangles that are the same as each other with respect to horizontal or vertical direction, and showing the states before and after the thickening process.
Figure 8B:
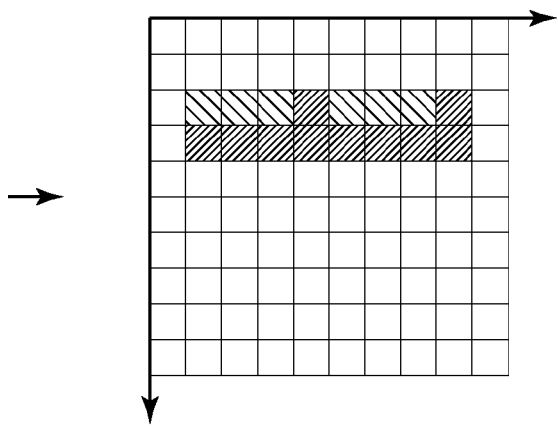
Figure 8C:
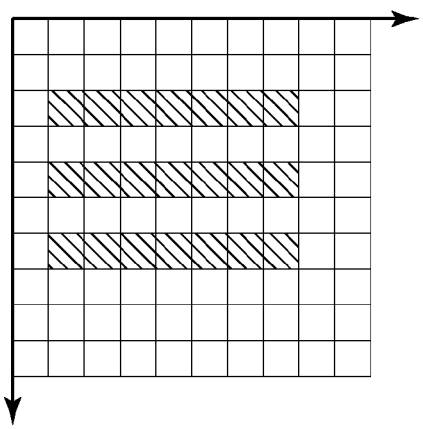
Figure 8D:
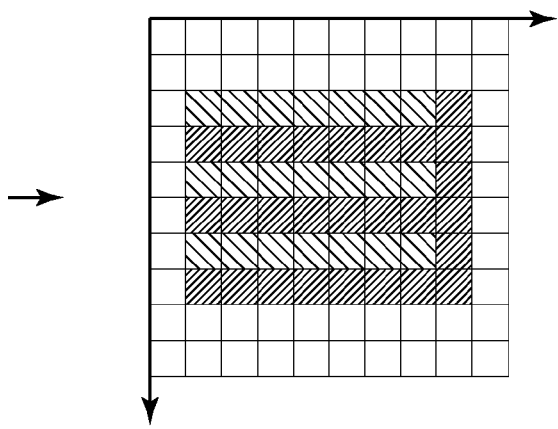

On the other hand, FIGS. 8A to 8D show respective cases in which drawing is performed such that a plurality of rectangles, which are in the same horizontal/vertical direction (inclination), are adjacent to each other. When the thickening process is performed on the rectangles shown in FIGS. 8A and 8C, they become rectangles shown in FIGS. 8B and 8D. As shown in FIGS. 8B and 8D, fill regions having not overlapped with each other come to join with each other, causing an unintended drawing result.

Accordingly, in the present embodiment, first, a result (a plurality of rectangle drawing commands and line drawing commands) of a determination by the drawing command determination section 202 that drawing commands are thin lines is temporarily held in the drawing command storage section 203. Thereafter, the thickening determination section 204 checks the sameness of the horizontal/vertical direction (inclination) and the joining/overlapping state after the thickening process, based on the mutual print positions by the drawing commands, and switches the thickening determination result.

Figure 9:
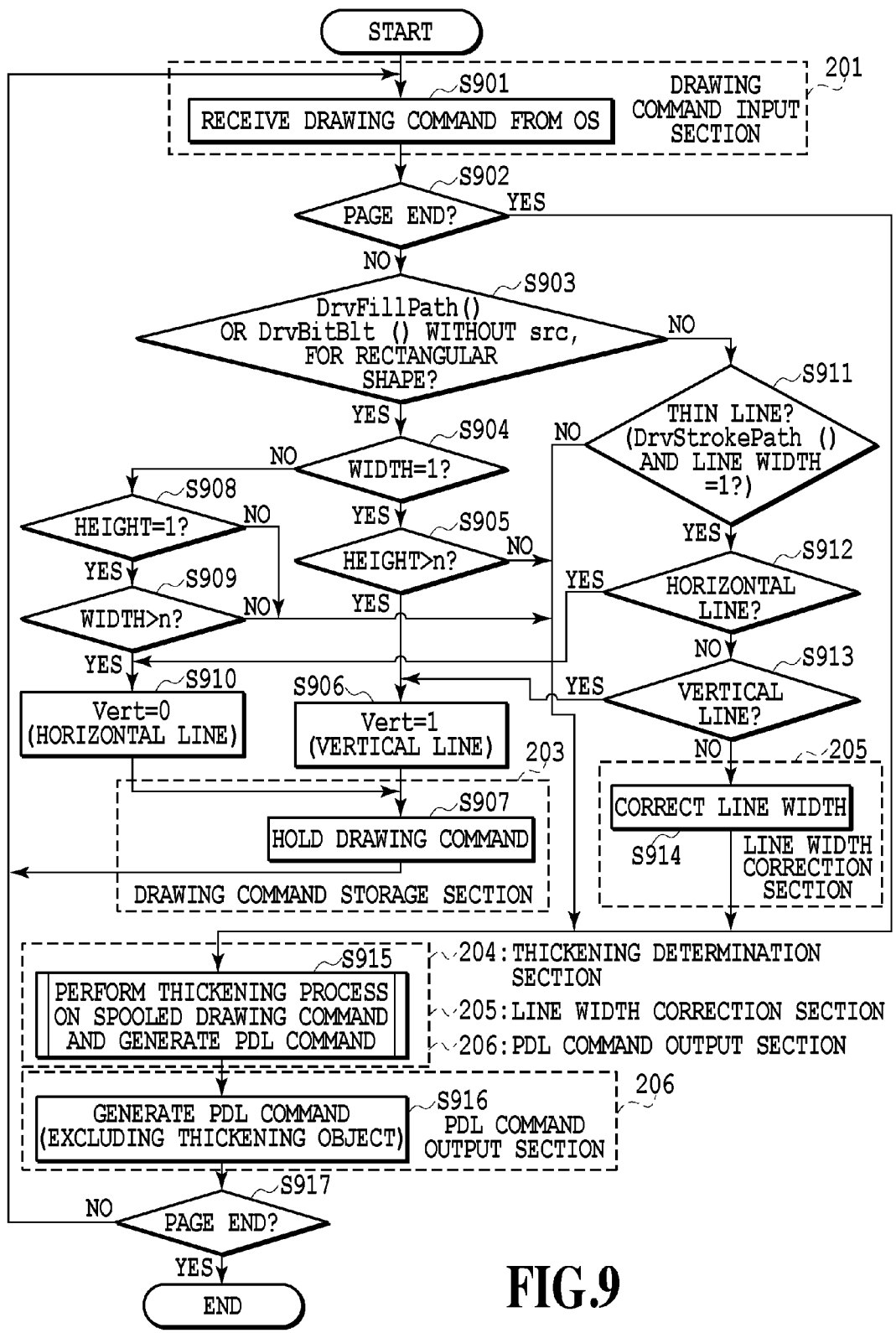
FIG. 9 is a flowchart showing the procedure of a thin line correction process in a second embodiment.
Figure 10:
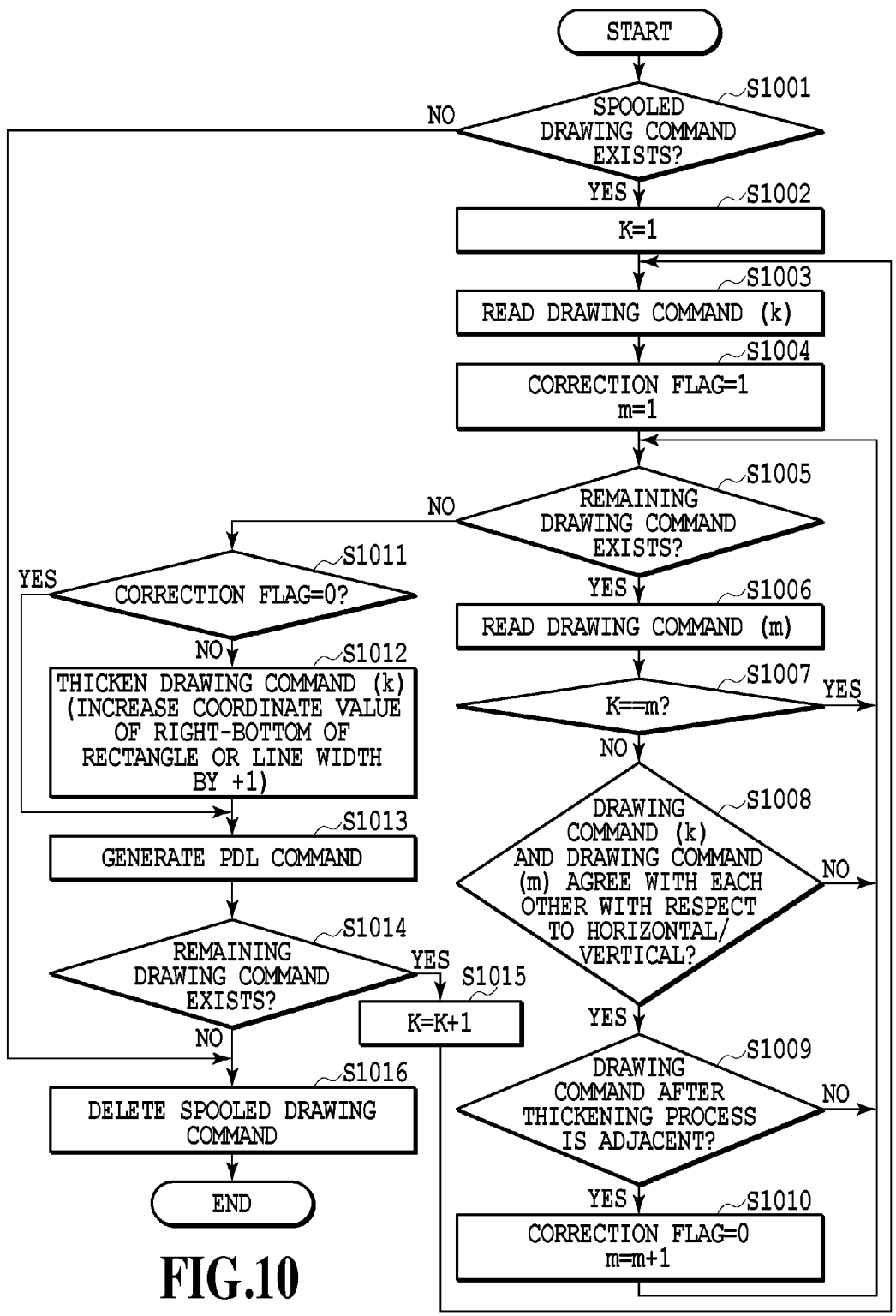
FIG. 10 is a flowchart showing the procedure of the thin line correction process in the second embodiment.

Referring to FIGS. 9 and 10, the procedure of a thin line correction process performed by the printer driver 107 in the present embodiment will be described below. FIG. 9 shows the procedure of drawing processing for one page. FIG. 10 shows the details of the processing procedure in S915 in FIG. 9.

In the present embodiment, the thickening determination section 204 determines whether or not to perform the thickening process on a line drawing command formed only by the horizontal or vertical component, depending on the state of adjacency to other line drawing commands.

The steps S901, S903, S911, and S914 in FIG. 9 are similar to the steps S501, S502, S507, and S508 in FIG. 5 in the first embodiment, respectively, and accordingly a description thereof will be omitted.

If a DDI function is determined to be a line drawing command for drawing a thin line in step S911, the drawing command determination section 202 determines whether this thin line is formed only by the horizontal component (S912). If this thin line is formed not only by the horizontal component, the drawing command determination section 202 determines whether this thin line is formed only by the vertical component (S913). A determination as to whether the thin line is formed only by either the horizontal component or the vertical component is performed by obtaining the inclination of the thin line, based on the coordinate values, at the start point and the end point, designated as parameters of the line drawing command (A description thereof will be omitted as it is a usual method).

If it is determined that the thin line is formed only by the horizontal component or the vertical component (Yes in S912 or Yes in S913), then the process proceeds correspondingly to S910 or S906, respectively, to set whether the thin line is a horizontal line or a vertical line. Details of the processing in the respective steps of S910 and S906 will be described later.

Then, similarly to a closed region fill command of a thickening target, the line drawing command is held in the drawing command storage section 203 in S907 to check the adjacency state of this drawing command.

Further, in S902 to S910 and S912 to S913, drawing commands for one page are sequentially received. As long as rectangle drawing commands and line drawing commands of potential targets of thickening are continuous, the drawing command storage section 203 spools these commands in S907. Then, in S915, the adjacency state of the drawing commands spooled in S907 is checked, and if no adjacent figures are present, then figure shapes expressed by these drawing commands are thickened. That is, in S915, it is determined whether or not a closed region fill command (thin line fill figure) for a thin line or a thin line drawing command satisfies preset conditions, and if a condition is satisfied, then the thickening process is performed on the thin line fill figure or the line drawing command.

In the present embodiment, the drawing command determination section 202 executes the respective steps in S902 to S906, S908 to S913, and S917, and the drawing command storage section 203 executes S907. Further, S915 (described referring to FIG. 10) is executed by the thickening determination section 204, the line width correction section 205, and the PDL command output section 206. The PDL command output section 206 also executes the process in S916 to convert drawing commands which are not thickening objects into PDL commands.

Herein, a thickening determination process in the present embodiment is assumed to be performed within a range where the order of drawing commands that the drawing command input section 201 receives from the OS and the order of PDL commands that the PDL command output section 206 generates agree with each other. Accordingly, the drawing command storage section 203 spools object commands within a range in which the drawing commands of the thickening potential targets (the rectangle drawing command or the line drawing commands of only horizontal/vertical component) are continuous. The thickening determination section 204 starts the thickening determination process on the spooled drawing commands, with a drawing command that is not a thickening target as a trigger.

Otherwise, in case of application to a system that can permit a delay of processing speed, an arrangement may be made such that the drawing command storage section 203 spools all drawing commands of thickening potential targets up to the end of pages, and the thickening determination section 204 starts the thickening determination process, with the end of pages as a trigger.

Subsequently, in S903 to S905, it is determined whether a drawing command is a rectangle forming a vertical thin line, and likewise in S903, and in S908 to S909, it is determined whether a drawing command is a rectangle forming a horizontal thin line. However, as a determination method here can be similar to that in Embodiment 1, a description thereof will be omitted.

However, in the present embodiment, in preparation for the determination process (described later) in S915 referring to the horizontal/vertical direction of a thin line, a determination is made as to whether or not a vertical thin line is set to a flag 'Vert' and held as a parameter of a rectangle drawing command. That is, Vert is set such that, if the rectangle is a vertical thin line, Vert=1 in S906, and if the rectangle is a horizontal line, Vert=0 in S910. In subsequent S907, a rectangle drawing command is spooled for a rectangle determined to be a thin line shape (a vertical thin line or a horizontal thin line), wherein the rectangle drawing command includes drawing parameters such as the left-top edge coordinate point, the right-bottom edge coordinate point, the color value for filling, and the like, and the flag 'Vert'.

As described above, by the process in S901 to S913, first, it is determined whether or not the drawing commands received from the OS are thin lines, wherein the determination is performed on the individual closed region fill commands and the individual line drawing commands, command by command. Then, drawing commands having been determined to be thin lines are individually determined as to whether they are horizontal lines or vertical lines. Then, the drawing commands, on each of which a setting has been made as to whether it is a horizontal line or a vertical line depending on this determination, are stored in the drawing command storage section 203.

In the present embodiment, the drawing command storage section 203 spools drawing commands in S907. The thickening process (S915) is performed on these spooled drawing commands at one of the following three timings. Namely, (1) when pages have come to an end (Yes in S902); (2) when the DrvStrokePath ( ) of a received drawing command is not a thin line (No in S911); (3) if the DrvStrokePath ( ) of a received drawing command for a thin line is neither a horizontal line nor a vertical line (No in S913) and after the line width of this drawing command is corrected (S914). In such a manner, by performing the thickening process also at a timing other than the end of pages, it is possible to reduce the processing load on the host computer 101.

A subsequent step S915 is executed each time a rectangle drawing command, which is not a thin line shape, or a drawing command, which is not a rectangle drawing command, has been received, or when a page control command such as a page end command has been received. Incidentally, if no closed region fill figure in a thin line shape has been spooled at this moment, the thickening process is not performed (determined 'No' in later-described S1001).

Finally, a PDL command corresponding to the group of drawing commands which are not thickening targets is generated in S916, and if this PDL command is not a page end command, then the process proceeds to S901 to process subsequent drawing commands (S917).

Referring to the flowchart in FIG. 10, the details of the step corresponding to S915 in FIG. 9 will be described below.

In FIG. 10, the thickening determination section 204 executes the respective steps of S1001 to S1011, S1014, and S1015; the line width correction section 205 executes S1012; and the PDL command output section 206 executes S1013 and S1016.

First, the thickening determination section 204 checks if drawing commands are spooled in the drawing command storage section 203 (S1001), and if no drawing command is present, then the thickening determination section 204 terminates the process. On the other hand, if drawing commands are present, then the thickening determination section 204 sets 1 to a variable k for identifying a spooled drawing command (S1002), and sequentially reads the $k^{th}$ drawing command (hereinafter, referred to as 'drawing command (k)' (S1003).

In subsequent S1004, the thickening determination section 204 sets a flag 'correction flag', for a determination as to whether to apply the thickening process on a drawing command (k), to 1 (true), and sets a variable m, for identification of a second drawing command to be a comparison object, to 1. Then, in S1005 to S1010, the position relationships of the drawing command (k) with other drawing commands (m) are sequentially checked so as to determine whether or not to correct the drawing command (k).

That is, in S1005 to S1006, spooled drawing commands (m) are read until when there is no more remaining figure. If k=m (in other words, drawing command (k)=drawing command (m)), the drawing command (m) then is skipped because these two drawing commands are the same one rectangle (the same drawing command (Yes in S1007). If these two drawing commands are not the same one rectangle (No in S1007), then the position relationship between the drawing command (k) and the drawing command (m) is checked (S1008 to S1009).

If both the drawing command (k) and the drawing command (m) are either horizontal lines or vertical lines (Yes in S1008) and these drawing commands are determined to be adjacent to each other (Yes in S1009), then the process proceeds to S1010. In S1010, the 'correction flag' is set to 0, and 'm' is increased by 1 to read the next drawing command.

Until it is determined that there are no more other drawing commands in S1005, the processes in the respective steps are performed, and if the 'correction flag' is finally 1 in S1011, then the drawing command (k) is determined to be a target of thickening.

Incidentally, in S1008, referring to the Vert flag determined in the step S906 or S910, the horizontal/vertical direction is compared between drawing commands. If the drawing commands are in the same direction, then the position relationship between the drawing commands is compared in S1009.

In the adjacency determination in subsequent S1009, in order to determine whether or not the figures are adjacent to each other after the thickening process, the right-bottom edge coordinates of the read-out two drawing commands are compared with respect to the values after corrections of the both. A method of adjacency determination will be described below, taking an example of a case that the drawing commands are horizontal lines (horizontal thin lines).

Herein, the coordinate values of the respective drawing commands after correction will be expressed as follows.

drawing command (k):
left-top edge point=(xa1, ya1)
right-bottom edge point=(xa2, ya2)
drawing command (m):
left-top edge point=(xb1, yb1)
right-bottom edge point=(xb2, yb2)

Incidentally, when a read-out drawing command is a line drawing command, the left-top edge point and the right-bottom edge point are obtained from the coordinates of the both ends (start point, end point) and the line width represented by parameters of the drawing command. For example, in a case of a line drawing command given with a start point (xs, ys), an end point (xe, ye), and a line width of w, the left-top edge point and the right-bottom edge point are as follows.

horizontal line segment:
left-top edge point=(xs, ys)
right-bottom edge point=(xe, ye+w)
vertical line segment:
left-top edge point=(xs, ys)
right-bottom edge point=(xe+w, ye)

By a method for determination of adjacency between drawing commands as expressed above, first, it is checked whether ya1 and yb1 are equal. If equal, as it is possible that the position relationship is as shown in FIG. 8A, it is further checked whether either xa2<xb1 or xb2<xa1 is satisfied. If neither of these two conditions is satisfied, then it is determined that these figures are adjacent to or overlapped with each other, and the drawing command (k) does not become a target of thickening.

On the other hand, if ya1 and yb1 are not equal, it is checked whether or not the position relationship is as shown in FIG. 8C. That is, it is checked whether either ya2<yb1 or yb2<ya1 is satisfied. Also in this case, if neither of these two conditions is satisfied, then it is determined that these figures are adjacent to or overlapped with each other, and the drawing command (k) does not become a target of thickening.

Finally, for the drawing command (k) determined to be a target of thickening, the line width correction section 205 corrects the coordinate value of the right-bottom edge of the rectangle by +1 (S1012), and the PDL command output section 206 generates a PDL command, based on the corrected parameter (S1013). Then, in S1014, if there are spooled drawing commands, 'k' is increased by 1 to likewise perform the thickening determination process also on a subsequent drawing command (S1015), and the process returns to S1003.

On the other hand, after generating PDL commands by performing the thickening determination process on all spooled drawing commands, the PDL command output section 206 deletes all drawing commands held in the drawing command storage section 203 (S1016), and the process is terminated.

As described above, it is determined whether or not to make a drawing command be a target of thickening, depending on the drawing positions of a plurality of fill figures, and it is thereby possible to prevent problems caused by unnecessary thickening process.

Further, targets of thickening are specified from individual drawing commands, and the thickening process is performed object by object. Thus, targets of correction can be surely narrowed down without making an error determination on other drawing objects, such as images, characters, and the like.

Third Embodiment

In the second embodiment, the adjacency state of a plurality of closed region fill figures has been made a determination condition for correction. However, determination conditions for the thickening process are not limited thereto. In the present embodiment, a result of a thickening determination is switched, depending on the type of logical operation (ROP: raster operation) in drawing a closed region fill figure. That is, it is determined whether or not a logical operation in drawing a closed region fill figure is a predetermined logical operation, and switching whether or not to perform a thickening process is carried out, corresponding to the determination result.

For example, when an ROP for performing a logical operation between the color (source) and the background (destination) of a rectangle to be drawn is designated, the result of the logical operation is changed by thickening the rectangle, which results in an unintended drawing in a case that this rectangle and another drawing command overlap each other. In this situation, in the present embodiment, even a rectangle having been determined to be in a thin line shape is not made be a target of correction in case the ROP is not designated for overwriting.

Figure 11:
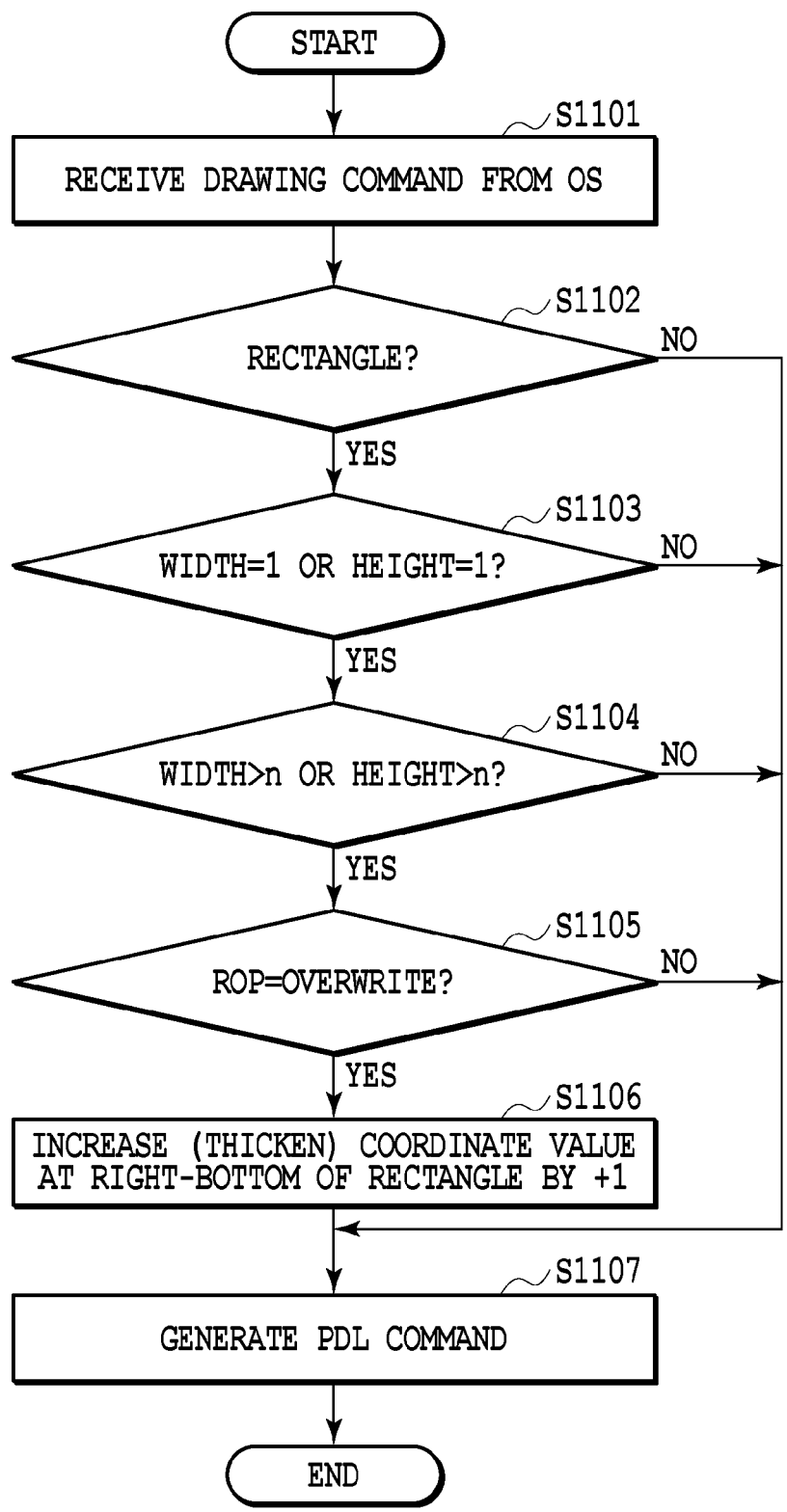
FIG. 11 is a flowchart showing the procedure of a thin-line correction process in a third embodiment.

FIG. 11 is a flowchart showing the procedure of a thin line correction process in the present embodiment. In the figure, the steps S1101 to S1104 are similar to the thickening target determination process (S501 to S504) in the first embodiment, respectively, and further, S1106 and S1107 respectively correspond to S505 and S506. Although, for brevity of description, it is assumed that a drawing command determination section 202 in the present embodiment does not make a line drawing command a target of the thickening process, it is also possible to make an arrangement such as to make a line drawing command a target. A thickening determination section 204 in the present embodiment checks, in S1105, the type of ROP designated for a thin line rectangle drawing command, and if the ROP is overwriting (ROP3 type=204, SRC-COPY), the ROP is determined to be a target of correction.

In the present embodiment, only ROPs designated for overwriting are determined to be targets of thickening, however, the spirit of the present invention is not limited thereto.

Fourth Embodiment

In the second and third embodiments, the adjacency state of a plurality of closed region fill figures or the ROP type has been made be condition for correction processing. In the present embodiment, in case that it is possible to specify, in advance, the color value of a figure that forms a rule line, the result of thickening determination is switched, depending on the color value of the figure.

Figure 12:
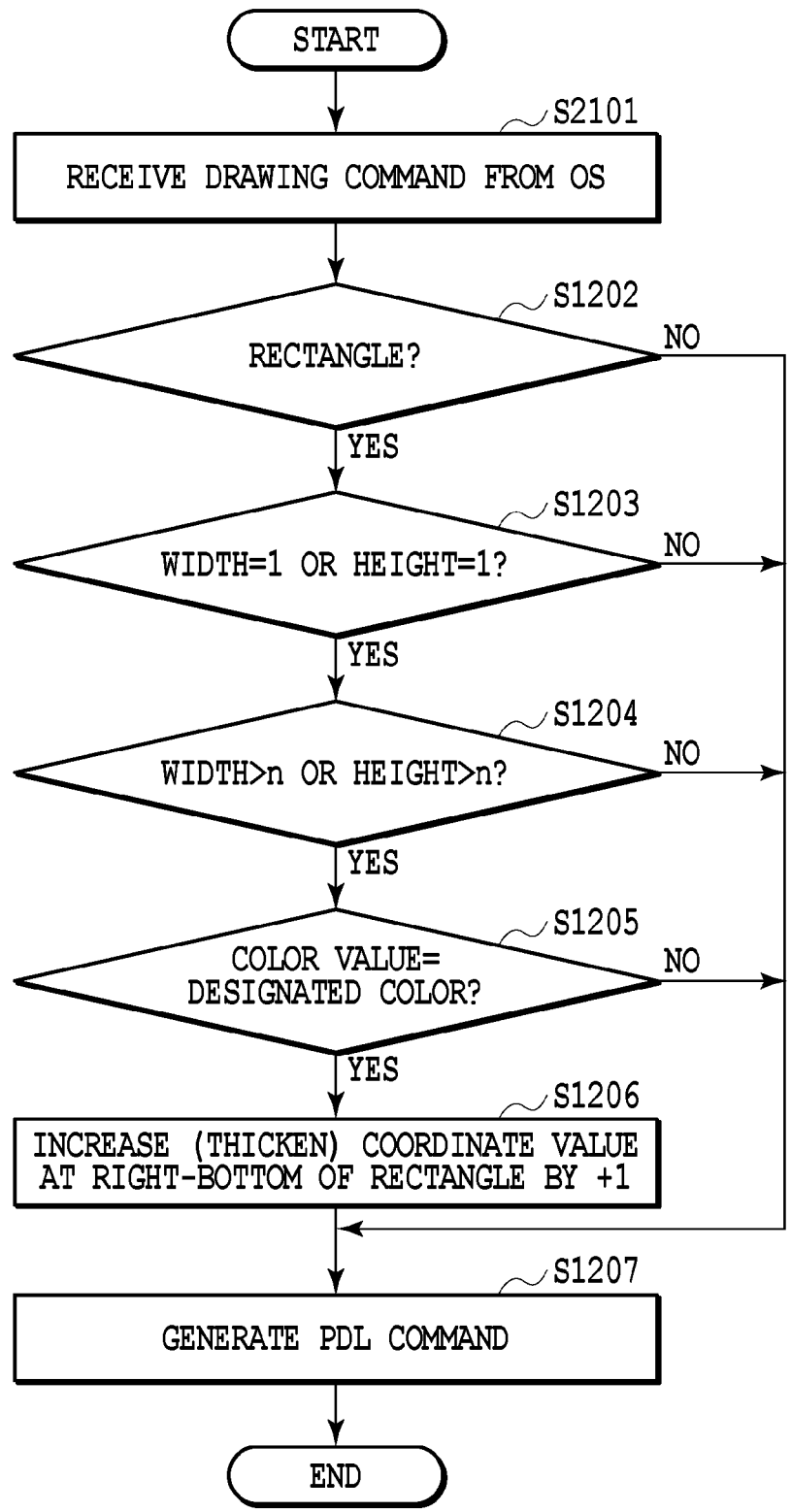
FIG. 12 is a flowchart showing the procedure of a thin line correction process in a fourth embodiment.

FIG. 12 is a flowchart showing the procedure of a thin line correction process in the present embodiment. Steps other than S1205 can be similar to the steps in FIG. 11 in the third embodiment. A thickening determination section 204 in the present embodiment checks the color value C1 designated to a rectangle drawing command, and if the color value C1 is the same as a color value C2 that is designated in advance, then the thickening determination section 204 determines the rectangle drawing command to be a target of correction (S1205). In the present embodiment, as a setting item of 'the Special Thin Line Process' for designation of a processing option of a printer driver, the color value C2 is further designated.

Further, it is unnecessary to limit the color value 2 to one color, and an arrangement may be such that, for example, the range of color hue, brightness, or the like, can be designated and correction can be performed as long as the color value of a rectangle is within the range of the color value.

As described above, according to the present embodiment, by providing means for designating the attribute (color value) of a fill figure to be made a target of thickening, it is possible to thicken, for example, only rule lines drawn in a specific color.

Fifth Embodiment

In the first to fourth embodiments, a description has been provided of embodiments with a printer driver 107 that operates on a host computer 101 and generates PDL data described in PDL, but the present invention is not limited thereto. The present invention can also be carried out with a printer 110 that receives the PDL data and performs image processing. That is, a thickening process is performed such that rectangle drawing commands, which form thin line shapes from the PDL data, are detected, and a display list, in which print coordinates that are parameters of the rectangle drawing commands are corrected, is generated.

Figure 13:
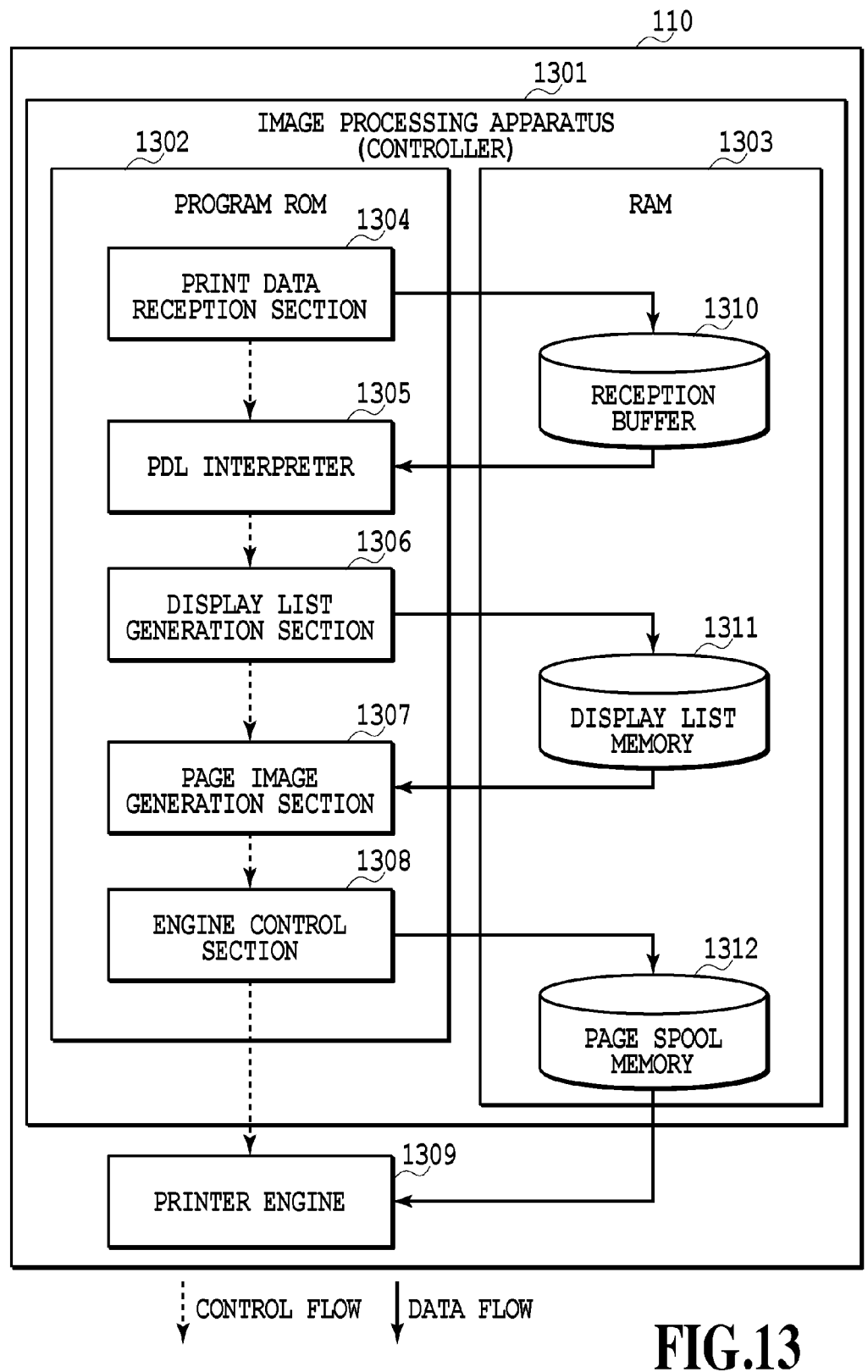
FIG. 13 is a diagram showing the module configuration of an image processing apparatus in a fifth embodiment.

FIG. 13 is a diagram showing the module configuration of a printer controller 1301 in the present embodiment.

In the figure, a group of control programs that implement the present invention is stored in a program ROM 1302, and is read by a CPU (not shown) to be executed. The control programs include a print data reception section 1304 that receives PDL data and stores the PDL data into a reception buffer 1310, and a PDL interpreter 1305 that analyzes the PDL data, and the like. The control programs further include a DL generation section 1306 that generates a display list (hereinafter, referred to as a DL) in an intermediate format, based on an analysis result by the PDL interpreter 1305 and stores the DL into a DL memory 1311 page by page, and a page image generation section 1307 that generates page images, based on the DL. The page images are compressed and stored into a page spool memory 1312, and output as video signals by an engine control section 1308 to a printer engine 1309.

In the present embodiment, the PDL interpreter 1305 performs a process corresponding to the modules 202 to 206 in FIG. 2. It is only required to replace drawing commands received from DDIs by PDL data, and replace the output PDL data by a DL.

Other Embodiments

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer, for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-187223, filed Aug. 24, 2010, which is hereby incorporated by reference herein in its entirety.

What is claimed is:

1. An image processing apparatus comprising:
a determination section that determines, for a drawing command that fills with a designated color a closed region which is represented by a plurality of coordinate points, whether the closed region is a thin line; and
a correction section that extends a shorter side of the closed region if the closed region is determined to be a thin line, wherein the determination section:
determines whether the closed region is a rectangle having four coordinate points;
extracts, if it is determined that the closed region is a rectangle, two coordinate points present on a diagonal of the rectangle among the four coordinate points;
determines whether a distance between the two coordinate points along an x axis or a y axis has a predetermined value; and
determines, if it is determined that the distance has the predetermined value, that the drawing command is a thin line.

2. An image processing method comprising:
a determining step of determining, for a drawing command that fills with a designated color a closed region which is represented by a plurality of coordinate points, whether the closed region is a thin line; and
a correcting step of extending a shorter side of the closed region if the closed region is determined to be a thin line, wherein the determining step comprises:
a determining step of determining whether the closed region is a rectangle having four coordinate points;
an extracting step of extracting, if it is determined that the closed region is a rectangle, two coordinate points present on a diagonal of the rectangle among the four coordinate points;
a determining step of determining whether the distance between the two coordinate points along an x axis or a y axis has a predetermined value; and
a determining step of determining, if it is determined that the distance has the predetermined value, that the drawing command is a thin line.

* * * * *